United States Patent [19]

Wicelinski et al.

[11] Patent Number: 4,952,469
[45] Date of Patent: Aug. 28, 1990

[54] LITHIUM-IODINE DEPOLARIZER

[75] Inventors: Steven P. Wicelinski, Reistertown; Henry J. Sunell, Baltimore, both of Md.

[73] Assignee: Mine Safety Appliances Company, Pittsburgh, Pa.

[21] Appl. No.: 460,526

[22] Filed: Jan. 3, 1990

[51] Int. Cl.⁵ .............................................. H01M 4/60
[52] U.S. Cl. ................................................... 429/213
[58] Field of Search ............... 429/213, 212, 218, 194, 429/223, 191; 252/500, 518, 519, 182.1

[56] References Cited

U.S. PATENT DOCUMENTS 4,148,975 4/1979 Schneider et al. .............. 429/213 X
4,276,362 6/1981 Harney ................................ 429/213
4,584,251 4/1986 Hunziker ....................... 429/213 X Primary Examiner—Anthony Skapars

[57] ABSTRACT

Improved lithium-iodine batteries have a depolarizer of charge transfer material of polyvinylpyridine and a divalent metal dibenzotetraazaanulene that is complexed with iodine in a ratio of 1 part by weight charge transfer material to 15 to 50 parts iodine.

10 Claims, 2 Drawing Sheets

LITHIUM-IODINE DEPOLARIZER

FIELD OF THE INVENTION

The present invention relates to an improved lithium-iodine battery and, in particular, to an improved depolarizer comprising a mixture of a divalent metal dibenzotetraazaannulene and polyvinylpyridine/$I_2$.

BACKGROUND OF THE INVENTION

Lithium-halide batteries in which a lithium anode and a charge transfer polymer complexed with a halogen to form a cathode or depolarizer are generally well known. Illustrative of these batteries are U.S. Pat. Nos. 4,148,975; 4,276,362 and 4,242,428. Batteries of this type have found wide application in cardiac pacemakers and for powering other electronic circuits such as wrist watches and computer memory and clock backup. Typical charge transfer complex materials include poly-2-vinylpyridine and poly-2-vinylquinoline (U.S. Pat. No. 4,148,874).

Also, iodine doped metal complexes have been disclosed, U.S. Pat. No.4,584,251, which are suitable as cathode materials for lithium/iodine or silver/iodide cells. These metal complexes comprise a divalent metal of nickel, iron, copper, cobalt, zinc, palladium or platinum and dibenzotetraazaannulene ("Mdbtaa").

It is an object of the present invention to provide improved battery performance over these prior art batteries. It is a further object of the invention to provide an improved battery having higher operating voltages during discharge and greater rate capability at lower temperatures than prior art P2VP/$I_2$ and Mdbtaa batteries.

SUMMARY OF THE INVENTION

The present invention comprises a lithium anode battery having a charge transfer complex. The charge transfer material is polyvinylpyridine (PVP) with from 1% to 50% by weight Mdbtaa. The resultant charge transfer material is blended with iodine in a ratio of 1 part charge transfer material to 14–50 parts by weight of iodine.

In a preferred embodiment of the invention the polymer is poly-2-vinylpyridine (P2VP) having a molecular weight greater than 30,000. Preferably, the divalent metal is either nickel or cobalt. The Mdbtaa is of the type disclosed in U.S. Pat. No. 4,584,251 which is incorporated by reference.

Batteries utilizing the depolarizer of the present invention show current rate capability approximately 20% greater than similar P2VP batteries and more than 600% greater than similar Mdbtaa depolarizer batteries. Other advantages of the invention will become apparent from a perusal of the following detailed description of the presently preferred embodiments taken in connection with the accompanying drawings.

PRESENTLY PREFERRED EMBODIMENTS

The depolarizer of the present invention is a pelletized or fused mixture of iodine, polyvinylpyridine, preferably poly-2-vinylpyridine and divaient metal dibenzotetraazaannulene. The molecular weight of polyvinylpyridine is preferably 30,000 to 400,000.

In the preferred method of manufacture, iodine and polymer is mixed with Mdbtaa in an amount between about 1% and 50% by weight of the polymer. Alternatively, the metal Mdbtaa is mixed with the polymer prior to the blending of the iodine. In the preferred embodiment, the divalent metal is nickel. The Mdbtaa is preferably used in an amount of from 3% to 20% by weight (to polymer) to provide the most improvement. With Mdbtaa in amounts in excess of about 50%, substantially no improvement results. Similar advantages have been achieved using cobalt.

Figure 1:
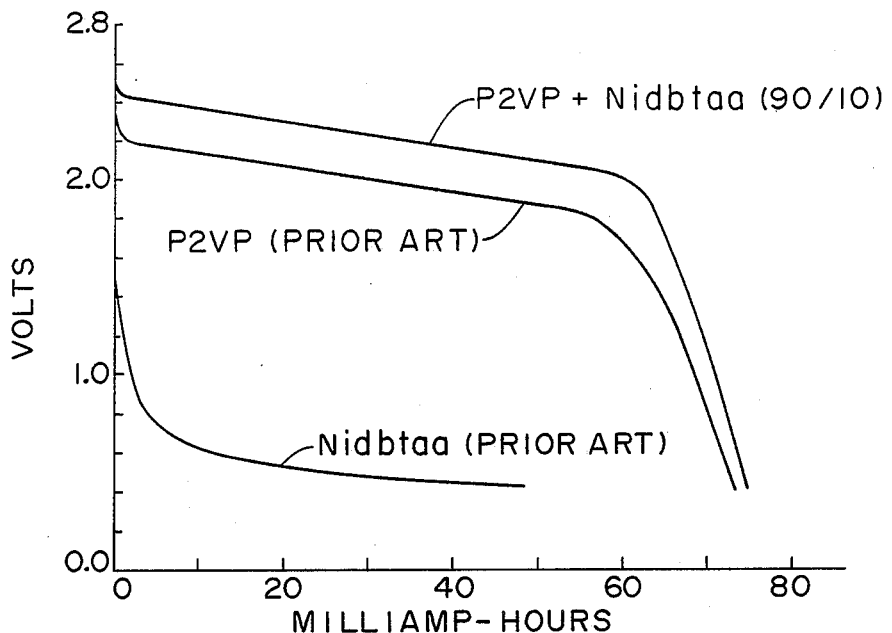
FIG. 1 is a graph showing the discharge curves of a prior art P2VP/$I_2$ battery, a Nidbtaa/$I_2$ battery and a battery according to the present invention under a 5 Kohm resistive load at 25° C.

With reference to FIG. 1, a button cell was made in accordance with U.S. Pat. No.4,148,975 using P2VP having an average molecular weight of 50,000 and having a 20:1 weight ratio of iodine to polymer. As shown in FIG. 1, this battery was identified as prior art (P2VP/$I_2$). A similar prior art battery using Nidbtaa/$I_2$ according to U.S. Pat. No. 4,584,251 was prepared. A battery in accordance with the present invention was prepared by adding to the prior art P2VP/$I_2$ depolarizer material, Nidbtaa in an amount equal to 10 weight percent of the P2VP.

All of the batteries were discharged through a constant 5 Kohm resistive load at 25° C. As can be seen from FIG. 1, the battery using the depolarizer of the present invention performed to a 2.0 volt cut-off better than either of the prior art batteries.

Figure 2:
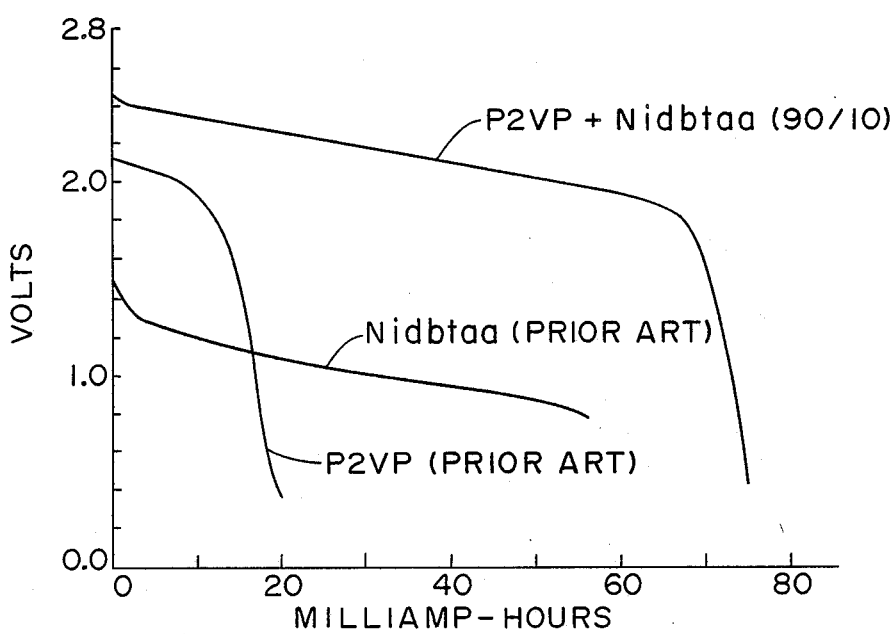
FIG. 2 is a graph showing discharge curves similar to FIG. 1, except the batteries were discharged at 10° C. under a 10 Kohm resistive load.

Referring to FIG. 2, batteries similar to those prepared in reference to FIG. 1 were discharged under a 10 Kohm resistive load at 10° C. As can be seen from the curve of the battery of the present invention, a significant improvement in the battery is obtained at low temperature.

Figure 3:
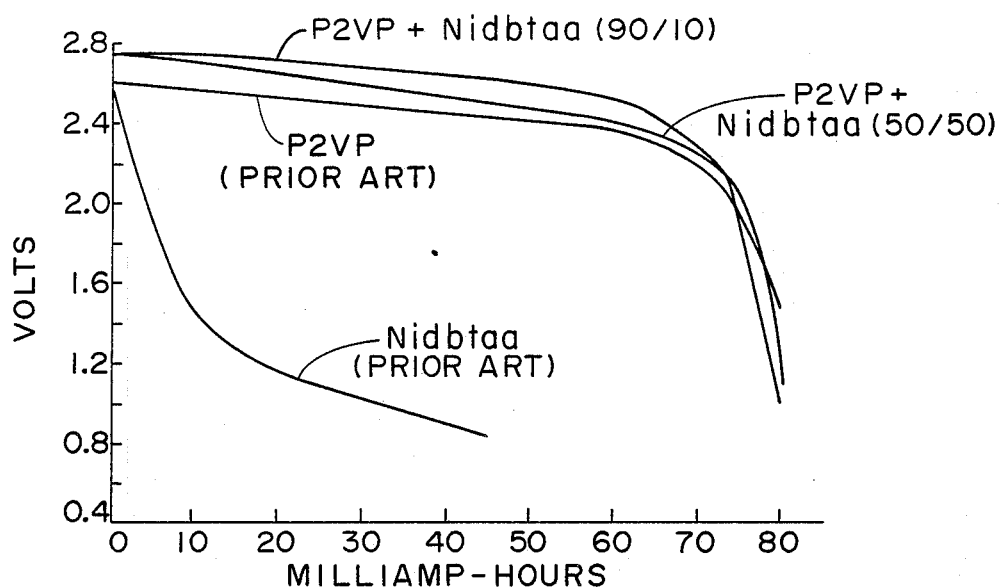
FIG. 3 is a graph showing discharge curves of prior art P2VP and Nidbtaa depolarizer batteries and batteries of the present invention showing the effect of various percentages of Mdbtaa mixes discharged at 37° C. under a 10 Kohm resistive load.

In FIG. 3, discharge curves represent the discharge of prior art P2VP and Nidbtaa batteries (the same as those of FIG. 1) through a 10 Kohm resistive load at 37° C. In comparison are discharge curves at 37° C. through a 10 Kohm load of batteries according to this invention with 90 parts P2VP to 10 parts by weight Nibtaa and 50 parts P2VP to 50 parts by weight Nibtaa.

As can be seen from the curves of FIG. 3, the batteries of the present invention operated at a higher loaded voltage than those of the prior art.

The depolarizers of the present invention provide batteries which have higher operating voltages during battery discharge and operate at higher efficacy than prior art P2VP/$I_2$.Li batteries. Moreover, the batteries of the present invention are capable of sustaining higher current drains at lower temperatures than prior art batteries. As shown in FIGS. 1-3, batteries of the invention demonstrate a 50 to 150 mV increase in plateau voltage during discharge.

While presently preferred embodiments of the invention have been shown and described in particularity, the invention may be otherwise embodied within the scope of the appended claims.

We claim:

1. A depolarizer for a lithium anode battery comprising a particulate charge transfer material of polyvinylpyridine having a molecular weight between about 30,000 to 400,000 and from 1% to 50% by weight of said polyvinylpyridine of a divalent metal dibenzotetraazaannulene, said charge transfer material being mixed with iodine in a ratio of about 14 to 50 parts by weight of iodine to each part of charge transfer material.

2. A depolarizer as set forth in claim 1, wherein the polyvinylpyridine is poly-2-vinylpyridine.

3. A depolarizer as set forth in claims 1 or 2, wherein said divalent metal is nickel.

4. A depolarizer as set forth in claims 1, 2 or 3, wherein said divalent metal dibenzotetraazaannulene is in an amount of from 3% to 20% by weight of said polyvinylpyridine.

5. A lithium battery comprising a lithium anode and a cathode comprising iodine and a charge transfer material of poly-2-vinyl pyridine and 1% to 50% by weight divalent metal dibenzotetraazaannulene, said iodine being present in an amount of 14 to 50 parts by weight to each part of charge transfer material.

6. A lithium battery as set forth in claim 5, wherein said divalent metal is nickel.

7. A lithium battery as set forth in claim 5, wherein said divalent metal is cobalt.

8. A lithium battery as set forth in claims 5, 6 or 7, wherein said divalent metal tetraazaannulene is present in an amount of from 3% to 20%.

9. A lithium battery as set forth in claims 5, 6 or 7, wherein said poly-2-vinyl pyridine has a molecular weight of 30,000 to 400,000

10. A lithium battery as set forth in claims 5, 6 or 7, wherein said charge transfer complex is either pelletized or fused.

* * * * *